United States Patent
Martinez

(10) Patent No.: US 6,980,305 B2
(45) Date of Patent: Dec. 27, 2005

(54) JOB SET MANAGER

(75) Inventor: Antonio Martinez, Chapalisa Zapopan Jalisco (MX)

(73) Assignee: Hewlett-Packard Development Company, L.P., Houston, TX (US)

(*) Notice: Subject to any disclaimer, the term of this patent is extended or adjusted under 35 U.S.C. 154(b) by 956 days.

(21) Appl. No.: 09/745,713

(22) Filed: Dec. 18, 2000

(65) Prior Publication Data

US 2002/0075510 A1    Jun. 20, 2002

(51) Int. Cl.[7] ............................................. G06K 15/00
(52) U.S. Cl. ...................... 358/1.1; 358/1.14; 358/1.16
(58) Field of Search ................................ 358/1.1, 1.14,
358/1.15, 1.16, 471, 1.18, 401, 479; 715/527,
715/528, 908, 907, 911

(56) References Cited

U.S. PATENT DOCUMENTS 5,450,571 A * 9/1995 Rosekrans et al. ............ 703/24
5,978,559 A   11/1999 Quinion
6,447,184 B2 * 9/2002 Kimura et al. ............... 400/578
6,738,156 B1 * 5/2004 Simpson et al. ............ 358/1.15

FOREIGN PATENT DOCUMENTS

EP    0772114       * 5/1997   ............. G06F 3/12
JP    2001265417    * 8/2001   ......... G05B 19/418

OTHER PUBLICATIONS

PC Magazine vol. 9, No. 19, Nov. 13, 1990, R. Murray, "New & improved", pp. 55-58, and DIALOG Accession No. 01387287. See "Software Print Spooling".

IBM Technical Disclosure Bulletin vol. 30, No. 5, Oct. 1987, "Enhanced PRINT queue management program", pp. 242-248.

* cited by examiner

Primary Examiner—Jerome Grant, II

(57) ABSTRACT

In a computer system, a method for managing print requests. The method includes associating related print requests with a job set and providing user accessible controls for managing that job set. In varying embodiments, these controls allow a user to select a particular job set and, for example, to simultaneously pause, delete, or prioritize each print request associated with that job set. In another embodiment, the method also includes monitoring the status of the job set.

12 Claims, 5 Drawing Sheets

Job Set Manager

*All*
Book
Catalog
Guide
*Novel*
Joe
Cathy

| File Name | Status | Owner | Printer | Bin |
|---|---|---|---|---|
| Toc | Printing | Sue | LaserJet | Default |
| Cover | Printing | Joe | Color | Default |
| Chapter 1 | Printing | Bob | High Capacity 1 | 1 |
| Index | Queue | Sue | LaserJet | Default |
| Chapter 2 | Queue | Fred | High Capacity 1 | 2 |
| Chapter 3 | Queue | Bob | High Capacity 2 | 1 |

Pause  Delete  Priority  Redirect

FIG. 5

JOB SET MANAGER

FIELD OF THE INVENTION

The invention relates generally to a method for managing computer printing. More particularly, the invention relates to a method for managing a group of related print requests as a single job set.

BACKGROUND

Generally, books, catalogs, and other larger scale publications are created and stored electronically as a number of individual electronic documents. For example, each chapter of a book may be stored as a separate electronic file. To produce the book each electronic file is opened using, for example, a word processor and a print request is then issued. The print requests may be directed to a single or group of printers. In a network environment, each print request may originate from a different computer. Each printer is only capable of printing one file at a time, so multiple print requests sent to a single printer are electronically stored in a queue. As the printer completes one request, another is released from the queue until each file is printed and the book is ready to be assembled.

In many conventional printing systems such as those used in office environments, for in-house and desktop publishing, and even in some large scale professional publishing systems, the print requests for each document, a book for example, are managed individually within the queues for each printer. In addition to the print requests for the book, the queues for each printer may also contain print requests for other documents. As the number of print requests increase so does the complexity of managing the queues. Should one printer temporarily fail, the other printers continue, and the user is not specifically alerted that a portion of the book is not being printed. Moreover, managing each print request for a larger scale production is cumbersome. For example, to delete or change the priority of the print requests for a given document, each request must be accessed individually within its respective queue. So, to stop or pause the printing of that document, a user is required to individually stop or pause the print requests for each file that makes up that document.

A second problem arises when a user wishes to track the print status for a book or other larger scale job. With any number of print requests being directed to any number of different printers, it becomes nearly impossible to know for certain when an entire job is completed or whether a printing error for a particular print request relates to a particular job. In a networked environment, five jobs containing five print requests are often directed to five different printers—one request from each job is sent to each printer. The conventional print queues for each printer provide individual control for and status of each print request. The queues do not associate the requests with a particular job. So, to track the status of a job, one must access the print queue for each of the five printers and manually determine which print request in each queue is associated with that job.

SUMMARY

The present invention is directed to a method for managing print requests in a computer system. The method includes computer readable instructions for associating related print requests with a job set and providing user accessible controls for managing that job set. In varying embodiments, these controls allow a user to select and monitor a particular job set and simultaneously pause, delete, or prioritize each print request associated with that job set. In another embodiment, the method also includes monitoring the status of the job set.

DESCRIPTION OF THE DRAWINGS

FIG. 5 is an exemplary screen display of a job set manager interface screen according to one embodiment of the present invention.

DESCRIPTION

Although the various embodiments of the invention disclosed herein will be described with reference to the computer network 10 shown schematically in FIG. 1, the invention is not limited to use with network 10. The invention may be implemented in or used with any computer system in which it is necessary or desirable to print electronic documents. The following description and the drawings illustrate only a few exemplary embodiments of the invention. Other embodiments, forms, and details may be made without departing from the spirit and scope of the invention, which is expressed in the claims that follow this description.

Figure 1:
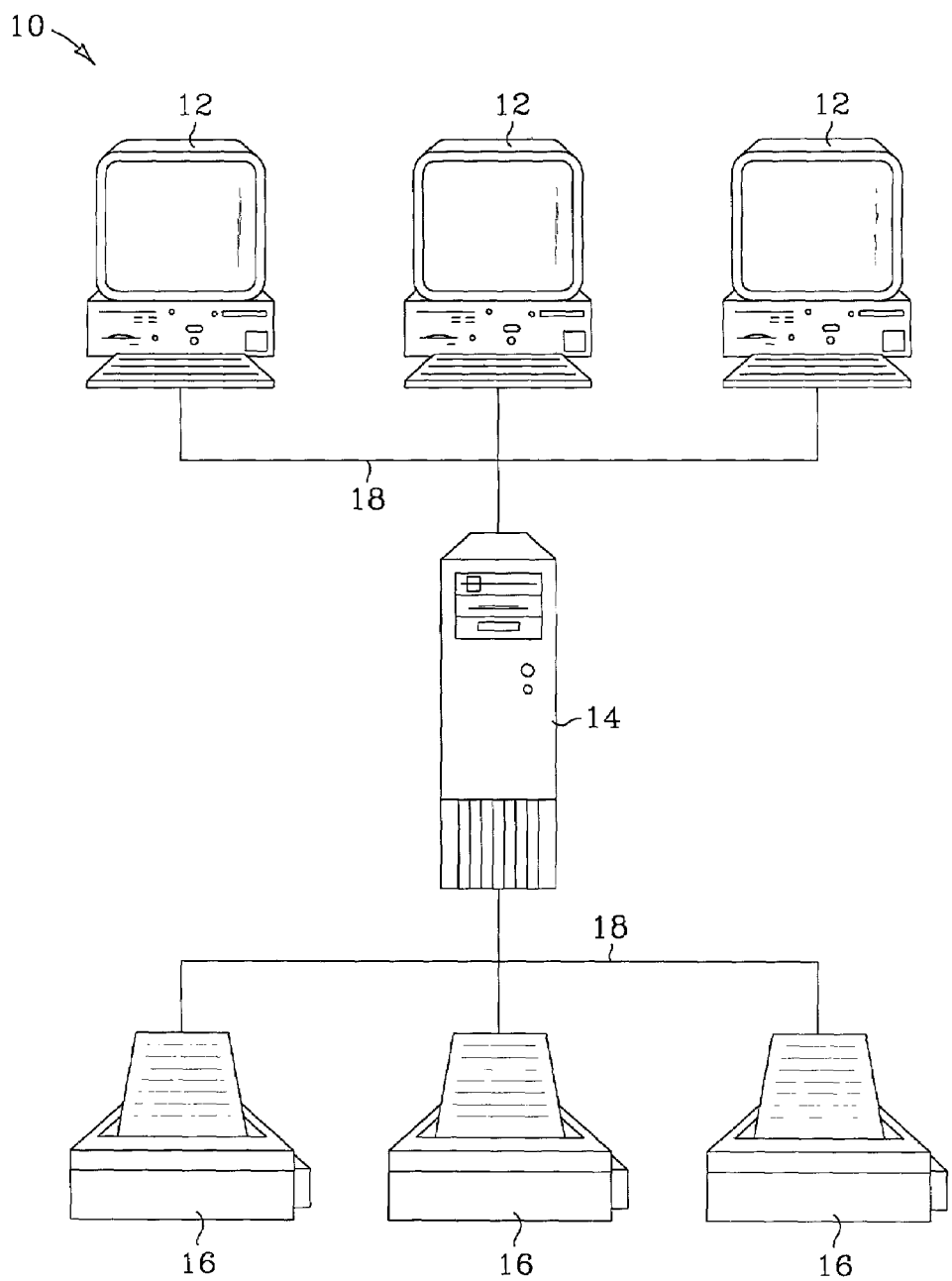
FIG. 1 is a schematic representation of a computer network that includes a server, several client computers, and several printing devices illustrating one system in which the invention may be implemented.

Referring to FIG. 1, network 10 represents generally any local or wide area network in which a variety of different electronic devices are linked. Network 10 includes one or more client computers 12, typically personal computer workstations, a server 14, and printers 16. Communication link 18 interconnects client computers 12, server 14, and printers 16. Communication link 18 represents generally a cable, wireless, or remote connection via a telecommunication link, an infrared link, a radio frequency link, or any other connector or system that provides electronic communication between the network devices. The path followed by link 18 between network devices 12, 14, and 16 in the schematic view of FIG. 1 represents the logical communication path between these devices, not necessarily the physical path between the devices. That is to say, for example, that server 14 need not be physically interposed between client computers 12 and printers 16. Rather, network devices can be connected to the network at any point and the appropriate communication path established logically between the devices which, in this example, would be from client computer 12 to server 14 and then to the respective printers 16.

Many larger electronic documents such as a novel, a text book, or a catalog are stored in a number of individual electronic files created using word processors, graphic editors, and other computer applications. To produce an entire document, client computers 12 open those files and issue separate print requests for each electronic file. Server 14 functions as a common link for receiving print requests from client computers 12, managing those requests, and ultimately forwarding the print requests to one or more printers 16 as specified by client computers 12. It is important to note that the functions of server 14 could be performed by software running on one or each of client computers 12 or by firmware present on one or each of printers 18. The present invention lies in the manner in which the print requests are managed and not in which component of network 10 ultimately manages the print requests.

Figure 2:
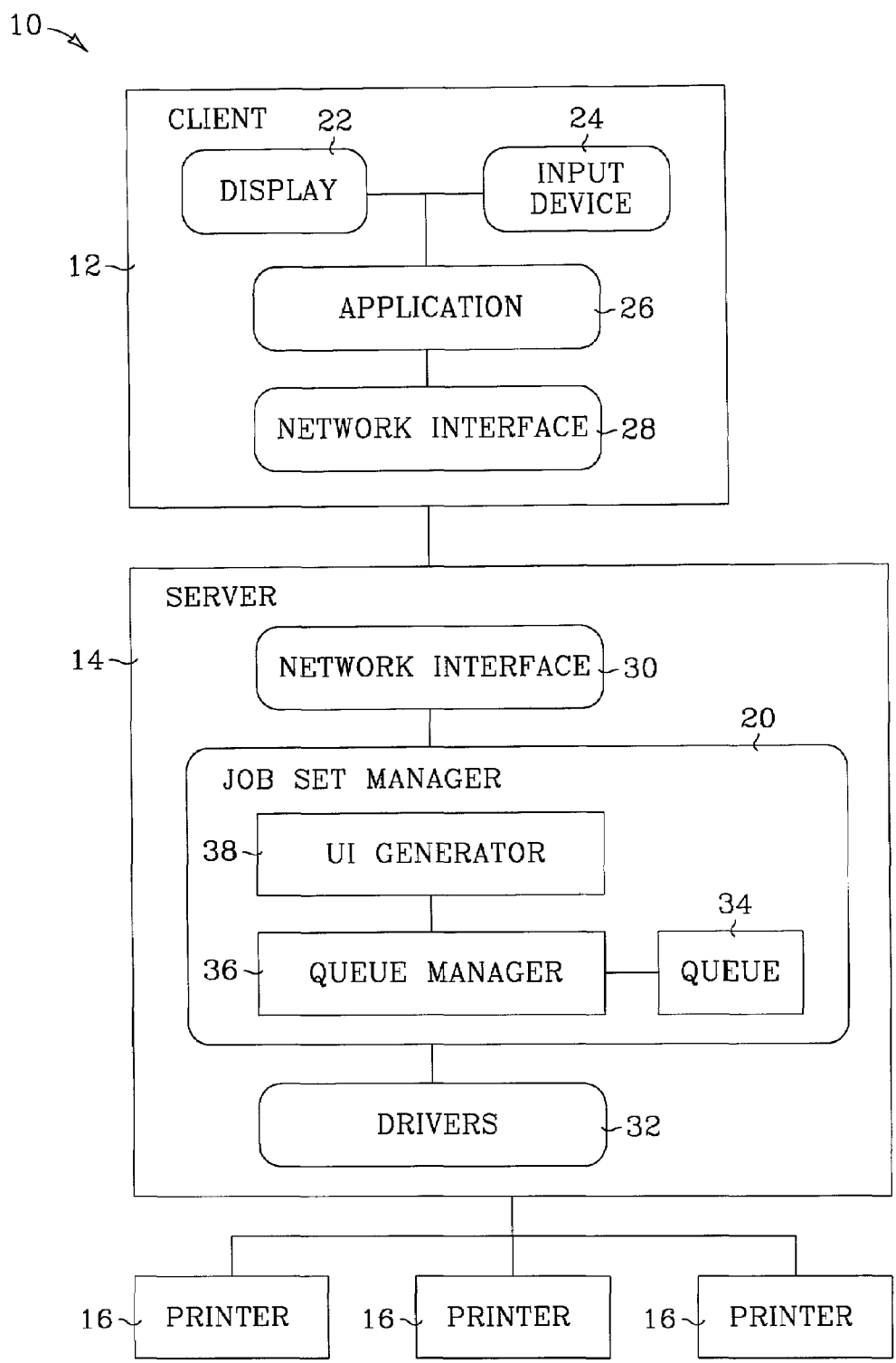
FIG. 2 is a block diagram of the network of FIG. 1 in which the invented job set print manager is embodied in software running on the server.

In FIG. 2, the invention is embodied in software labeled as job set manager 20 running on server 14 and will be described in detail below. Client computer 12 provides a mechanism for the user to create and save electronic files and ultimately issue print requests for those electronic files. Each client computer 12 generally includes a monitor or other suitable display device 22 and a keyboard and/or a pointing device such as a mouse or other suitable input device 24. Application 26 may be a word processor, graphic editor, and/or any other computer program product capable of issuing a print request. Network interface 28 enables client computer 12 to communicate with server 14.

Similarly, server 14 includes network interface 30 enabling server 14 to communicate with client computer 12. Server 14 receives print requests from client computer 12 through network interfaces 28 and 30. Job set manager 20 (described in greater detail below) receives and manages those print requests—ultimately delivering them to printers 16 using drivers 32. Using application 26, a user opens electronic files and issues a print command. In response, application generates a print request consisting of a series of generic instructions to print a corresponding electronic file. These generic instructions include directions to print the text and graphics of a document, directions for collating, stapling, binding, or other finishing instructions, as well as the specific image forming device responsible for printing file. These generic instructions for each electronic file are bundled into a print request delivered to job set manager 20 on server 14. Job set manager 20 eventually forwards each print request to the appropriate printer 16 using drivers 32. Drivers 32 translate the generic instructions of each print request specialized commands for the particular printer 16 handling the print request.

Job set manager 20 includes queue 34, queue manger 36, and user interface generator 38. Generally speaking, queue 34 is an electronic holding bin allowing server 14 to manage a group of print requests simultaneously directed to a common printer. Queue manager 36 administers the print requests within queue 34. User interface generator 38 acts as a translator between queue manager 36 and client computer 12. User interface generator 38 causes client computer to display the status of each print request as well as user accessible controls for directing how queue manager 36 manipulates the print requests held within queue 34. User interface generator 38 also interprets the commands entered on client computer 12 using those controls sending the appropriate directions to queue manager 36. The controls produced by user interface generator 38 can take many forms. They may be push-buttons, radio buttons, text boxes, scroll bars, or pull-down menus accessible using a keyboard and/or a pointing device such as a mouse connected to client computer 12. In a non-graphical environment, the controls may be command lines allowing the user to enter textual commands using a keyboard connected to client computer 12.

It is important to note that server 14 and printers 16 may each also include a display device capable of providing a user interface displaying the controls described above. Those devices 14 and 16 would then each also include an input device providing a user access to those controls. In such cases, user interface generator 38 would then interpret the commands entered on server 14 or printers 16 using those controls and then send the appropriate directions to queue manager 36.

While FIG. 2 shows each of the components of job set manager 20 operating on server 14, one or all of those components could instead operate on one or each of client computers 12 or on one or each of printers 16. For example, a separate queue 34 could be present on each printer 16, queue manager could be present on server 14, while a user interface generator 38 could operate on each client computer 12.

Figure 3:
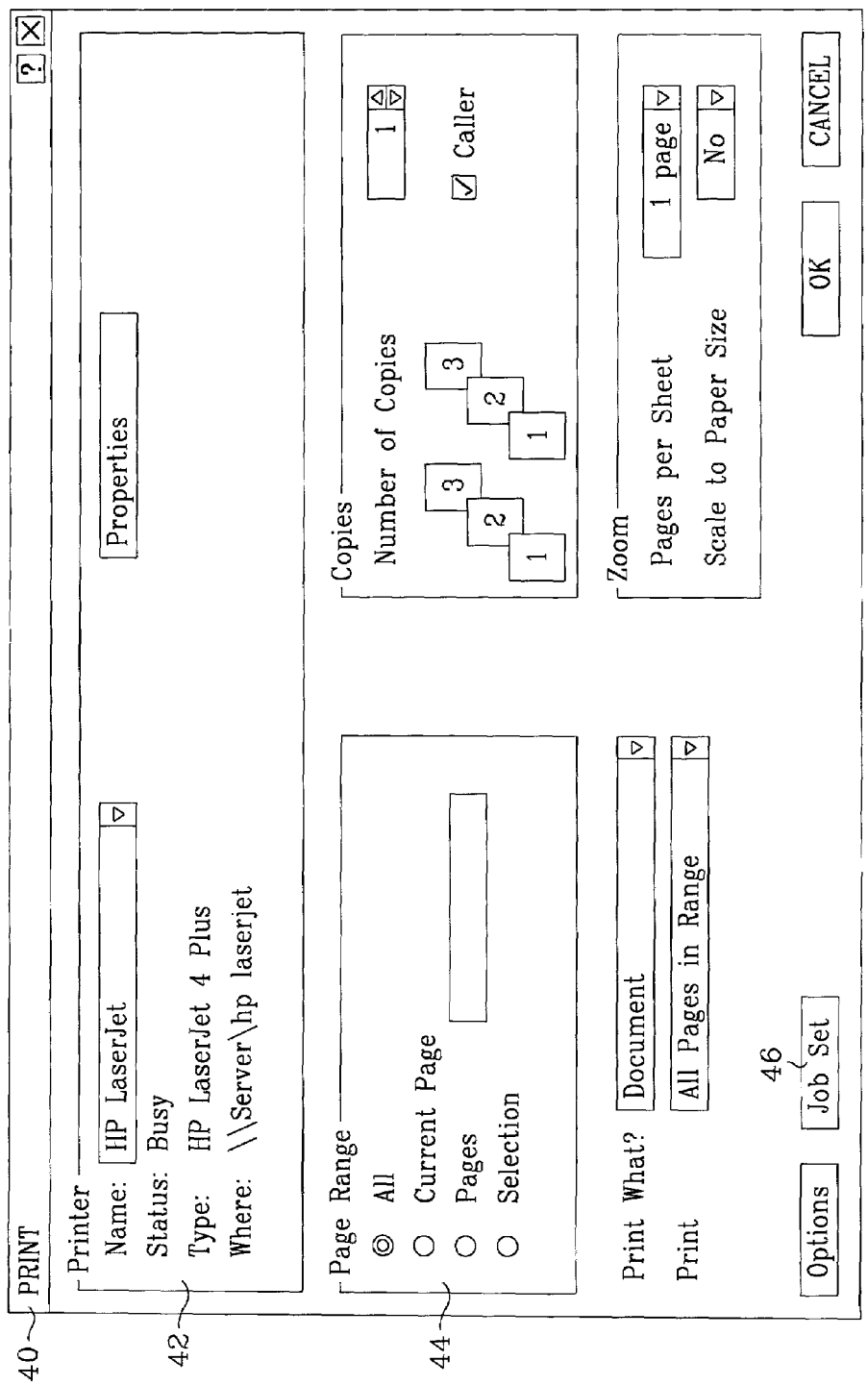
FIG. 3 is an exemplary screen display illustrating a print command interface screen containing a job set control button.

Referring now to FIGS. 2 through 5, a description of the invented job set manager will be discussed in detail. To print a document comprised of a group of electronic files, each of those electronic files is opened and a print command is selected using application 26. In response to each print command and in preparation for issuing a print request, application 26 causes client computer 12 to generate print interface screen 40 on display device 22, a graphical example of which is illustrated in FIG. 3. Print interface screen 40 includes controls 42 allowing a user to select a particular image forming device to print the file. Other controls 44 and 45 allow the user to select which pages of the file to print and to specify the number copies of each specified page to be printed.

Figure 4:
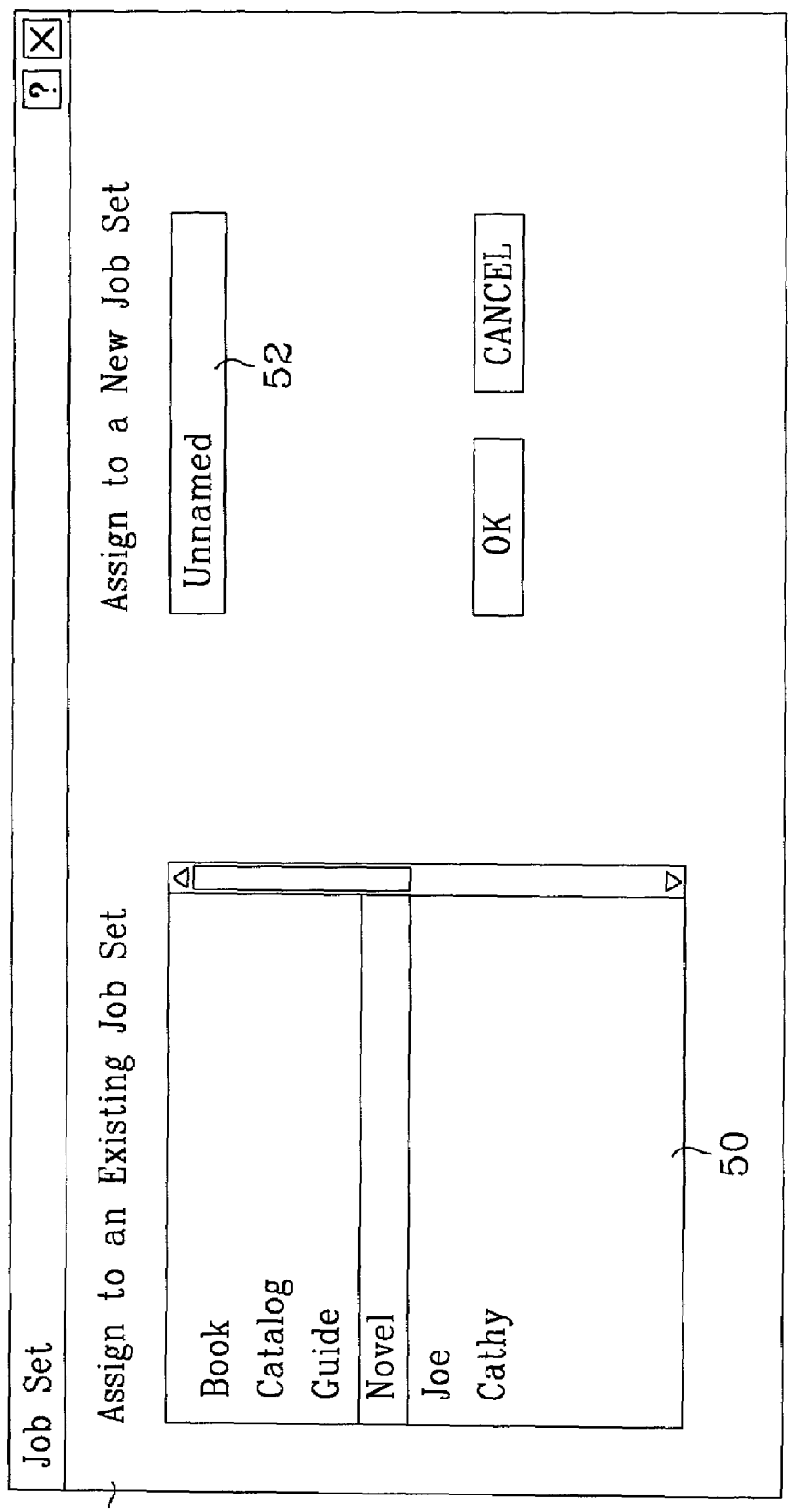
FIG. 4 is an exemplary screen display of a job set interface screen allowing a user to assign a print request to a new or existing job set.

More importantly here, however, is job set control 46. Selecting control 46, using a pointing or other input device 24, directs user interface generator 38 to display job set interface screen 48, an example of which is shown in FIG. 4. Interface screen 48 allows a user to associate a print request with a user specified job set. This gives each user the ability when printing related files, to link each of those files with a common job set. So, in addition to containing the generic instructions to print and finish an electronic file, the print request also contains a job set tag. For example, if the user is printing a novel from of five electronic files, the user associates the print request for each of the five files with the same job set—in this case "Novel." Another user may be printing a catalog made up of seven electronic files. That user would then associate the print requests for each of those six files with a different job set—entitled "Catalog" for instance.

Before displaying job set interface screen 48, user interface generator 38 requests a list of existing job sets, that is, those job sets associated with print requests held in queue 34, from queue manager 36. User interface generator 38 then displays control 50—a list of the existing job sets from which a user may choose to associate a new print request. Additionally, interface screen 48 also includes control 52—a text box allowing a user to associate a new print request with a new job set. It is important to note that while controls 50 and 52 are illustrated as part of interface screen 48, those controls could also be displayed as a part of interface screen 40 shown in FIG. 3.

Upon receipt, queue manager 36 places each print request issued by application 26 in queue 34. Having a job set linking the print requests for the files of a particular document allows queue manager 36 to manage those print requests individually and as a group. Referring now to FIG. 5, with user interface generator 38, job set manager 20 generates interface screen 54 on display device 22. Interface screen 54 includes control 56—a scroll bar—for selecting a particular job set. Allowing a user to monitor each job set, user interface generator 38 displays in control 58 a list of the print requests associated with the selected job set. In the example shown in FIG. 5, for each print request, control 56 includes the status of the request, the owner or user who originated the print request, the image forming device responsible for printing the request, and other information such as the bin into which the responsible printer will output the printed sheets for the particular print request.

Interface screen 54 also includes controls 60–66 allowing a user to direct queue manager 36 to manipulate print requests within queue 34. Identifying each print request associated with a selected job set, queue manager 36 is able to simultaneously manipulate each of those print requests and manage the job set as a whole. These manipulations include, but are not limited to, simultaneously pausing, deleting, and redirecting the print requests within queue 34. With a job set selected, "Novel" for example, a user can select control 60 directing queue manager 36 to simultaneously pause the printing of each print request associated with "Novel." Selecting control 62 would cause queue manager 36 to delete the print requests associated with "Novel." Alternatively, the user may instead select and pause or delete one or more individual print requests displayed in control 58.

Generally, queue manager 36 delivers print requests from queue 34 to printer 16 in the order that the print requests were received into queue 34. That is to say, the first print request sent to queue 34 is generally the first print request sent to printer 16. Circumstances, however, may require that a particular job set be printed immediately even though the job requests that make up that job set are not currently a priority within queue 34. Selecting control 64 directs queue manager 36 to deliver to printers 16 those print requests of the job set selected in control 56 ahead of other print requests.

Should, a particular printer become inoperative for any reason, the user is alerted in interface screen 54. The user can then choose, within control 58, the print requests the would otherwise have been directed to the malfunctioning printer. Selecting control 66, then, causes queue manager 36 to redirect those print requests to another printer. Referring to the example of FIG. 5, the "High capacity 2" printer is malfunctioning. Choosing the print request entitled "Chapter 3" and then selecting control 66 causes queue manager 36 to redirect that print request to a functioning printer—for example, "High Capacity 1."

What is claimed is:

1. A computer program product for managing print requests for a plurality of electronic documents, the product comprising a computer useable medium having computer readable instructions thereon for:
   associating the print requests with a job set; and
   providing user accessible controls for managing the job set, wherein the instructions for providing user accessible controls comprise instructions for generating an interface screen allowing simultaneous management of each print request in the job set, the user interface screen including a control for allowing the user to simultaneously start or pause each print request in the job set.

2. The product of claim 1, wherein the interface screen includes a control for allowing the user to simultaneously delete each print request in the job set.

3. The product of claim 1, wherein the interface screen includes a control for allowing the user to simultaneously change the priority of each print request in the job set in relation to the other print requests.

4. The product of claim 3, wherein the interface screen includes a control for allowing the user to simultaneously redirect each print request in the job set.

5. A computer program product for managing print requests for a plurality of electronic documents, the product comprising a computer useable medium having computer readable instructions thereon for:
   associating the print requests with a job set; and
   providing user accessible controls for managing the job set, wherein the instructions for providing user accessible controls comprise further instructions for generating an interface screen allowing individual management of each print request in the job set, the user interface screen including a control for allowing the user to individually start or pause one or more selected print requests within the job set.

6. The product of claim 5, wherein the interface screen includes a control for allowing the user to individually delete one or more selected print requests within the job set.

7. The product of claim 5, wherein the interface screen includes a control for allowing the user to individually redirect one or more selected print requests within the job set.

8. A method for managing print requests for a plurality of electronic documents, comprising:
   associating the documents with a job set; and
   providing user accessible controls for managing the job set, wherein at least one user accessible control is either a control for allowing a user to individually start or pause one or more selected print requests within the job set or a control for allowing the user to simultaneously start or pause each print request in the job set.

9. The method of claim 8, wherein the act of associating comprises generating an interface screen with controls allowing the user to associate the print requests with a new or existing job set.

10. The method of claim 8, further comprising generating an interface screen displaying the status of each print request associated with the job set.

11. The method of claim 8, wherein the act of providing user accessible controls comprises generating an interface screen allowing simultaneous management of each print request in the job set.

12. The method of claim 11, wherein the act of providing user accessible controls further comprises generating an interface screen allowing individual management of each print request in the job set.

* * * * *